Patented Feb. 1, 1944

2,340,771

UNITED STATES PATENT OFFICE 2,340,771

GOLD COMPOUNDS OF THE CINCHONA ALKALOIDS AND THEIR DERIVATIVES AND METHOD OF MANUFACTURING SAME

Albert Rothmann, Berlin-Charlottenburg, Germany, assignor, by mesne assignments, to Rare Chemicals, Inc., New York, N. Y., a corporation of New York No Drawing. Application November 18, 1940, Serial No. 366,142. In Germany December 1, 1939

8 Claims. (Cl. 260—284)

My invention relates to therapeutically effective gold compounds and to methods of manufacturing same.

Gold compounds have been already used for the treatment of chronic arthritis. It has been observed in this connection that the usefulness of the compound is essentially dependent upon the way in which the gold is attached to the molecule. Of special therapeutic interest were chiefly those compounds showing a structure of the type R—S—Au, R representing an aliphatic, aromatic or heterocyclic rest. Best known among inorganic gold salts is gold sodium thiosulphate. So-called double salts with one organic component have been hitherto less used in therapeutics or were soon abandoned again.

It has now been found that one obtains gold double compounds which are very effective against the disease mentioned above by converting cinchona alkaloids or their derivatives and gold halides into double salts. With various cinchona alkaloids gold double salts have already been made, as for example with $AuCl_3$ (ref. Liebig's Annalen der Chemie, vol. 129, p. 17, vol. 135, p. 338 and vol. 241, p. 265) all of them showing the formula: cinchona alkaloid . $2HCl.2AuCl_3$. They were prepared by dissolving the alkaloid in hydrochloric acid and adding gold trichloride in excess. On testing them they were found to produce irritation in the tissues.

Entirely non-irritative double salts are obtained, however, by mixing the bases of the alkaloids or their derivatives dissolved in an organic solvent, preferably in alcohol, with solutions of gold halides, as for instance $AuCl_3$ or $AuCl_3.HCl.4H_2O$ in an organic solvent. In most cases the organic double salts precipitate immediately or they may be precipitated by adding ether or some other precipitant. They correspond to the general formula chinchona alkaloid . $AuHal_3$. They are distinguished by being non-irritative, non-poisonous and especially by their therapeutic action in chronic joint diseases. Taking in account that gold double salts of nearly similar formula have not been found useful in therapeutics and only gold compounds with the gold being attached to the molecule by sulphur, are still being used, the new double compounds are of special importance.

The new double salts are insoluble in water and the usual organic solvents but easily soluble in benzyl alcohol and in a mixture of the latter with vegetable oils.

Examples (1) 3.2 grams quinine dissolved in 20 ccms. methanol is mixed with 4.1 grams $AuCl_3.HCl.4H_2O$ dissolved in 20 ccms. methanol. After a short time there precipitates the gold double salt $C_{20}H_{24}O_2N_2.AuCl_3$. It is sucked off and dried. Melting point 148–152° C. (under decomposition). Au:f.=31.96%, c.=31.42%.

A similar compound is obtained by using 3 grams $AuCl_3$.

(2) Corresponding to Example 1 a gold double salt is obtained with quinidine, having a melting point of 158°.

(3) Out of 1.2 grams acetyl quinine and 1.3 grams $AuCl_3.HCl.4H_2O$, each dissolved in 10–15 ccms. methanol and mixed, results a double salt of the formula: $C_{22}H_{26}O_3N_2.AuCl_3$. When separating off it is somewhat oily but on rubbing and cooling on ice it gradually becomes solid. It melts under decomposition at 162–163° C.

(4) To 2.26 grams hydro-iodo-quinine, dissolved in 30 ccms. of absolute ethyl alcohol, 2.1 grams $AuCl_3.HCl.4H_2O$, dissolved in alcohol, are added. The double salt precipitates immediately. It is yellow and melts under sintering and decomposition at 142–144° C.

(5) 1.1 grams hydro-quinine and 1.0 gram $AuCl_3.HCl.4H_2O$ are each dissolved in 10 grams of acetone and mixed. By adding ether the yellow colored double salt is precipitated. It darkens at about 139° C. and melts under sintering and decomposition at 183° C.

(6) 1.3 grams dimethylaminoethylhydrocupreine are dissolved in 8 ccms. methanol and mixed with a solution of 1.4 grams $AuCl_3.HCl.4H_2O$ in 5 ccms. methanol. The resulting double salt is oily; by adding some ether and cooling on ice it gradually turns solid. At 86° C. it starts decomposing.

(7) To a solution of 1.1 grams quinine in 10 ccms. chloroform is added 2 grams $AuBr_3.HBr.5H_2O$ dissolved in 10 ccms. chloroform with 0.5 ccm. ether. By adding petroleum ether an oil separates off which after decanting and treating with petroleum ether gradually becomes solid. The dark red colored product melts after sintering and under decomposition at 175–176° C.

By "cinchona alkaloids" in my specification and claims I mean cinchona alkaloid bases such as quinine, quinidine, acetyl quinine, hydroiodoquinine, hydro-quinine and dimethyl-amino-ethylhydrocupreine.

Various changes may be made in the details disclosed in the foregoing specification without departing from the invention or sacrificing the advantages thereof.

In the claims affixed to this specification no selection of any particular modification of the invention is intended to the exclusion of other modifications thereof, and the right to subsequently make claim to any modification not covered by these claims is expressly reserved.

I claim:

1. Double gold-halide salts of cinchona alkaloids of the formula cinchona alkaloid $\cdot$ AuHal$_3$ said salts being precipitated in solid form and the salt portion thereof being free of acid substituents, said salts being prepared as a therapeutic.

2. A double gold-chloride salt of a cinchona alkaloid having the formula $C_{20}H_{24}O_2N_2 \cdot AuCl_3$, said salt being precipitated in solid form and the salt portion thereof being free of acid substituents, said salt being prepared as a therapeutic.

3. A double gold-chloride salt of acetyl quinine having the formula $C_{22}H_{26}O_3N_2 \cdot Cl_3$, said salt being precipitated in solid form and the salt portion thereof being free of acid substituents, said salt being prepared as a therapeutic.

4. A double gold-chloride salt of hydro-quinine having the formula $C_{20}H_{26}O_2N_2 \cdot AuCl_3$, said salt being precipitated in solid form and the salt portion thereof being free of acid substituents, said salt being prepared as a therapeutic.

5. The process of producing therapeutically effective double gold-halide salts of cinchona alkaloids which comprises reacting a gold halide with a cinchona alkaloid in the presence of an organic solvent.

6. The process of producing therapeutically effective double gold-halide salts of cinchona alkaloids which comprises reacting a gold-halide with a cinchona alkaloid in the presence of a lower mono-hydric alcohol.

7. The process of producing therapeutically effective double gold-halide salts of cinchona alkaloids which comprises reacting AuCl$_3$ with a cinchona alkaloid in the presence of a lower mono-hydric alcohol.

8. The process of producing therapeutically effective double gold-halide salts of cinchona alkaloids which comprises reacting AuCl$_3 \cdot$HCl$\cdot$4H$_2$O with a cinchona alkaloid in the presence of a lower mono-hydric alcohol.

ALBERT ROTHMANN.